G. A. BENTLEY.
SEED POTATO CUTTING MACHINE.
APPLICATION FILED NOV. 10, 1917.

1,411,832.

Patented Apr. 4, 1922.

Inventor
G. A. Bentley.

UNITED STATES PATENT OFFICE.

GEORGE A. BENTLEY, OF MARTHON, IOWA.

SEED-POTATO-CUTTING MACHINE.

1,411,832.   Specification of Letters Patent.   Patented Apr. 4, 1922.

Original application filed August 14, 1917, Serial No. 186,130. Divided and this application filed November 10, 1917. Serial No. 201,296.

*To all whom it may concern:*

Be it known that I, GEORGE A. BENTLEY, a citizen of the United States, residing at Marthon, in the county of Buena Vista and State of Iowa, have invented certain new and useful Improvements in Seed-Potato-Cutting Machines; and I do hereby declare the following to be a full, clear, and exact description of the invention, such as will enable others skilled in the art to which it appertains to make and use the same.

This invention relates to a device for cutting seed potatoes so that the potatoes of various sizes will all be cut into pieces of a uniform size, whereby they can be conveniently and easily planted by a potato planter.

The subject matter of this application is disclosed but not claimed in my co-pending application, Serial Number 186,130, filed August 14, 1917.

An object of the invention is to provide a seed potato cutting device which comprises a plurality of compartments having knives positioned therein, the upper edges of which knives are sharpened, and the knives are arranged so that they will cut the potatoes delivered into the different compartments in sections of a uniform size, and further to provide vertically movable heads which are moved through the rotation of a crank shaft for forcing the potatoes upon the cutting knives to cut them.

With the foregoing and other objects in view this invention consists in certain novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which.

Figure 1:
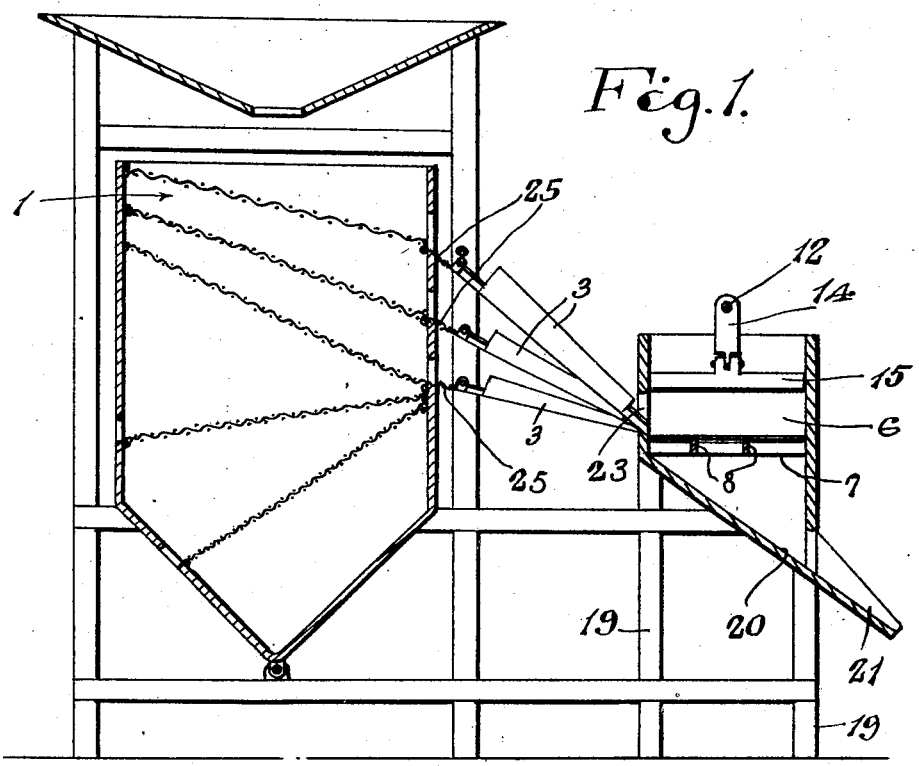
Figure 1 is a view of the improved seed potato cutting machine showing it arranged in connection with a sorting device for sorting the potatoes which are fed to the various compartments of the cutting machine.

Referring more particularly to the drawings, 1 designates a potato sorter, and while a particular type of sorter is illustrated in the drawings, it is to be understood that any type of sorter may be used in connection with the improved cutting machine. The sorted potatoes are fed from the sorting means, to the cutting means which is generically indicated by the numeral 2, through suitable troughs 3. The guide troughs 3 have communications with the various compartments 4, 5, and 6 of the potato cutter 2, so that all of the large potatoes will be fed from the sorting mechanism 1 to the compartment 4 with the medium size potatoes to the compartment 5 and the relatively small potatoes to the compartment 6. The compartments 4, 5, and 6 are made of such size to just receive the size potatoes fed thereto. The compartment 4 has a knife blade 7 extending longitudinally therethrough and a pair of knife blades 8 extending cross-wise therethrough. The knife blades 7 and 8 have their upper edges sharpened, and are positioned for dividing the compartment 4 into a plurality of relatively smaller compartments, corresponding to the size of the pieces of the potatoes to be cut.

The compartment 5 has a knife 9 extending longitudinally therethrough and a second knife 10 extending cross-wise therethrough. These knives also have their upper edges sharpened and they are positioned for dividing the compartment 5 into relatively small compartments of substantially equal size to the relatively small compartments into which the compartment 4 is divided by the knives 7 and 8 so that the potatoes which are cut in the compartment 5 will be cut into pieces of uniform size with the pieces of potatoes which are cut in the compartment 4. The small compartment 6 is provided with a single knife 11 which extends therethrough and is provided for cutting potatoes which are fed into this compartment into pieces in substantially a uniform size with the pieces which are cut in the compartments 4 and 5.

Figure 2:
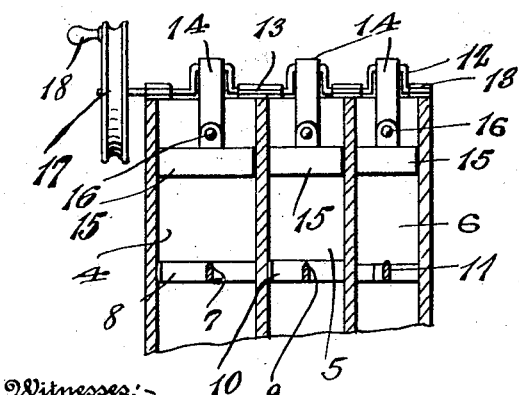
Figure 2 is a vertical section through the cutting machine.
Figure 3:
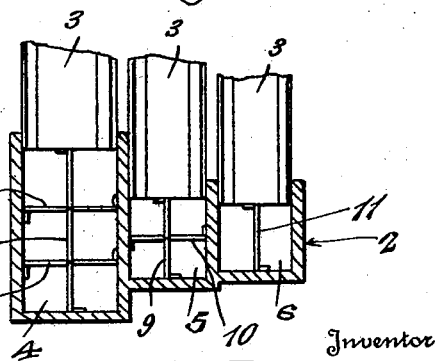
Figure 3 is a horizontal section through the cutting machine.

A crank shaft 12 is rotatably supported by suitable bearings 13 above the upper edges of the compartments 4, 5 and 6 and it has pitmen or connecting rods 14 connected to the wrists thereof. Compressor heads 15 are connected to the connecting rods 14 as shown at 16. The various compressor heads 15 are positioned within the compartments 4, 5 and 6 so that upon the rotation of the crank shaft 12 these compressor heads will move vertically within the compartments for forcing potatoes upon the knives carried by the compartments, during the downward stroke of the head for cutting the potatoes. The crank shaft 12 may be rotated in any suitable manner. In Figure 2 of the drawings it has a groove pulley 17 mounted thereon to the outer surface of which pulley is attached a handle 18 so that the crank shaft may either be manually rotated or rotated from any suitable type of prime mover.

The various compartments 4, 5 and 6 of the potato cutter are supported by a suitable supporting structure 19 and the bottom 20 of the compartment is inclined and extends outwardly beyond the edge of the compartments as shown at 21 for forming a guide to guide the potatoes in any suitable type of receptacle. The side 22 of the compartment is provided with a plurality of openings 23, through which the potatoes are fed into the respective compartments.

The troughs 3 are constructed for coaction with any suitable type of sorting means 1 so as to maintain a connection between the sorting means and the cutting means at all times. To accomplish this result, the troughs 3 have portions 25 thereof made of flexible material such as burlap, or any other suitable type of fabric and these flexible sections are connected directly to the sorting means so that a connection will be maintained between the various troughs and the sorting means during movement of the sorting means.

In reducing the invention to practice, certain minor features of construction, combination and arrangement of parts may necessitate alterations to which the patentee is entitled provided such alterations are comprehended within the scope of what is claimed.

What is claimed is:—

A machine of the class described including sorting means, and cutting means for the different grades sorted cooperating with said sorting means and proportioned to the grades.

In testimony whereof I affix my signature in presence of two witnesses.

GEORGE A. BENTLEY.

Witnesses:
HOWARD D. BENTLEY,
J. H. WEGONLUS.